(12) United States Patent
Ohla et al.

(10) Patent No.: US 6,933,054 B2
(45) Date of Patent: Aug. 23, 2005

(54) BEARING MATERIAL FOR THE MANUFACTURE OF WEAR-RESISTANT SLIDE BEARINGS MADE OF A COPPER-ALUMINUM-ALLOY WITH DEFINED COVER LAYERS

(75) Inventors: Klaus Ohla, Illerkirchberg (DE); Michael Scharf, Dietenheim (DE)

(73) Assignee: Weiland-Werke AG, Ulm (DE)

( * ) Notice: Subject to any disclaimer, the term of this patent is extended or adjusted under 35 U.S.C. 154(b) by 212 days.

(21) Appl. No.: 10/310,700

(22) Filed: Dec. 5, 2002

(65) Prior Publication Data

US 2003/0129427 A1 Jul. 10, 2003

(30) Foreign Application Priority Data

Dec. 6, 2001 (DE) .......................... 101 59 949

(51) Int. Cl.$^7$ .................. B32B 15/04; C22C 9/01; F16C 33/12
(52) U.S. Cl. ................. 428/472.2; 420/489; 420/478; 384/625; 384/912; 384/913
(58) Field of Search .............. 428/472.2, 629, 428/674, 675, 676, 677; 384/625, 913, 912; 420/489, 478, 479, 480, 471

(56) References Cited

U.S. PATENT DOCUMENTS

| | | | | |
|---|---|---|---|---|
| 3,578,443 A | * | 5/1971 | Grant et al. .................. 419/19 |
| 3,726,987 A | * | 4/1973 | Pryor et al. .............. 174/50.61 |
| 3,826,627 A | * | 7/1974 | Pryor et al. .................. 428/633 |
| 3,867,799 A | * | 2/1975 | Pryor et al. .................... 52/235 |
| 5,174,012 A |   | 12/1992 | Hamilton ...................... 29/603 |
| 5,387,461 A | * | 2/1995 | Kamiya et al. ............. 428/216 |
| 5,430,258 A | * | 7/1995 | Hoshino ..................... 174/250 |
| 5,913,147 A | * | 6/1999 | Dubin et al. ................ 438/687 |
| 6,521,523 B2 | * | 2/2003 | Lee et al. ................... 438/633 |

FOREIGN PATENT DOCUMENTS

| | | |
|---|---|---|
| DE | 1 187 805 | 2/1965 |
| DE | 36 42 825 | 1/1988 |
| DE | 40 38 139 | 6/1992 |
| DE | 44 17 455 | 11/1995 |
| DE | 198 01 074 | 7/1999 |
| DE | 199 46 018 | 6/2000 |
| EP | 0 167 102 | 1/1986 |
| GB | 2 192 641 | 1/1988 |
| JP | 59-222585 | * 12/1984 |
| JP | 05-074653 | * 3/1993 |
| JP | 2000-239763 | * 9/2000 |

OTHER PUBLICATIONS

Wieland Brochure "Gleitelemente" {Slide Elements}, Edition Jun. 1997, in particular p. 5 (12 pages).
Dubbel: "Taschenbuch fuer den Maschinenbau" {Pocket Book for Mechanical Engineering 20$^{th}$ Edition/2001} pp. E86/E87 (3 pages).
Patent Abstracts Of Japan: JP 59–22285, Dec. 14, 1984 (1 page).
Patent Abstracts Of Japan: JP 60–19972, Feb. 1, 1985 (1 page).
Patent Abstracts Of Japan: JP 02–301909, Dec. 14, 1990 (1 page).
Patent Abstracts Of Japan: JP 04–250995, Sep. 7, 1992 (1 page).
Patent Abstracts Of Japan: JP 08–261184, Oct. 8, 1996 (1 page).
Effect Of Chromic Acid Anodizing Treatment on Fretting Behaviour During Fretting Tests on Pre–Stressed Specimens, by P. Reybet Degat et al.; Thin Solid Films 298 (1997), pp. 170–176.
Patent Abstracts Of Japan: JP 09–013133, Jan. 14, 1997 (1 page).

* cited by examiner

*Primary Examiner*—John J. Zimmerman
(74) *Attorney, Agent, or Firm*—Flynn, Thiel, Boutell & Tanis PC

(57) ABSTRACT

A bearing material for the manufacture of wear-resistant slide bearings made of a Cu—Al-alloy, consisting of 0.01 to 20% Al, optionally further elements, the remainder copper and the common impurities. The slide bearing has for this purpose an outer, wear-reducing cover layer with a range of thickness D=10 nm to 10 $\mu$m and consists exclusively of aluminum oxide.

12 Claims, 1 Drawing Sheet

BEARING MATERIAL FOR THE MANUFACTURE OF WEAR-RESISTANT SLIDE BEARINGS MADE OF A COPPER-ALUMINUM-ALLOY WITH DEFINED COVER LAYERS

FIELD OF THE INVENTION

This invention relates to a bearing material for the manufacture of wear-resistant slide bearings made of a copper-aluminum-alloy with defined cover layers.

BACKGROUND OF THE INVENTION

The bearing materials used in the automotive industry are distinguished by a combination of various, favorable characteristics.

These are:

high modulus of elasticity low friction coefficient good emergency running properties anticorrosion characteristics high strength.

In spite of this, damages in the billions occur annually due to wear. To avoid this wear is therefore an important task.

The separation of the running partners by intermediate layers, for example triboreaction layers, has generally wear-reducing effects in bearing materials. However, the formation of reaction layers takes place almost exclusively non-defined and is determined by the cooperation of pressure, temperature, lubricant and the chemical reaction of the running partners during use.

Significant wear can be proven during the so-called break-in phase. For this reason it would be important to apply prior to the first use a defined wear protection.

SUMMARY OF THE INVENTION

The basic purpose of the invention is therefore to apply defined wear-reducing layers on slide bearings.

The purpose is attained according to the invention by providing a bearing material made of an aluminum-containing copper alloy, which consists of 0.01 to 20% aluminum, optionally one or several elements from the group iron, cobalt, manganese, nickel, silicon, tin up to a maximum total of 20%, optionally up to 45% zinc, the remainder copper and common impurities, and which has a thin cover layer of a thickness D, which cover layer consists exclusively of aluminum oxide (the percentage information refers to the weight).

It has been discovered that aluminum oxide layers clearly reduce wear (formation of so-called tribooxidation layers), as is in particular shown in the exemplary embodiment. The layers are characterized by being extremely hard and less active regarding outside influences. The oxidation-layer thickness lies often in the range of a few nanometers (several atom layers), which can be noticed by the glittering multicolored "starting layers". Light, which passes the layers, is thereby, depending on the viewing angle, reflected by varying characteristic wave lengths. Upon exceeding a boundary layer thickness, this effect again disappears, and the surface color is determined by the oxide. Even though oxides are in general very brittle, and break open or break off through outside force, starting layers have a high adhesive characteristic. One assumes that two varying structures (metal/oxide) try to form coherent or at least semi-coherent boundary surfaces (Frank van der Merwe mechanism). The crystal planes are each opposite one another, which crystal planes have similar symmetry and lattice metrics, thus an epitaxy.

Epitaxic boundary surfaces are those with the least possible energy and cause a maximum of nuclei, which are equipped with just this epitaxy. Since, however, substrate (metal) and host (oxide) do not perfectly fit on one another, this incompatibility is balanced by elastic distortions and, if this is not sufficient, by building in boundary-surface dislocations, whereby the boundary surface strives for an energetic minimum. With an increasing incompatibility and increasing lateral expansion and thickness of the host nuclei, the dislocation density increases such that it becomes unstable. The cohesion is lost.

Aluminum oxide layers have a high thermodynamic stability with simultaneously small diffusion coefficients for ions. Aluminum oxide layers will therefore also form in atmospheres with very low oxygen partial pressure and will remain stable. Due to the above-indicated lateral growth tensions, $Al_2O_3$-layers have, however, the tendency, even under isothermal conditions, to break off and to form tears and pores. The reason for this is the parallel, however, oppositely directed mass transport of oxygen and metal ions in the oxide. Oxide is formed within the oxide layer on grain boundaries. The resulting tension pressure is sufficient, for example, to bend sheet metal oxidized on one side. During the transfer of aluminum ions into the oxide, there occurs furthermore an ion vacancy in the metal. The vacancies condense at the metal/oxide phase boundary and form pores.

A thin aluminum oxide layer (starting layer) represents a compromise between a good adhesiveness and the disclosed problems.

It is indeed possible in practice to produce purposefully oxidation layers through suitable thermal treatments in air or other oxygen-containing atmospheres, however, the protection is reduced by the formation of several thermodynamically stable oxides in alloys with varying expansion coefficients mixed oxides (spinells) with an often high degree of imperfection and correspondingly high diffusion coefficient.

The formation of pure oxide layers in alloys depends on the temperature and the respective pressure of formation. Since $Al_2O_3$ has a comparably extremely low pressure of formation, the exclusive formation of aluminum oxide is possible.

The aluminum-containing copper alloy is purposefully annealed in a gas atmosphere with a low oxygen partial pressure. The oxygen partial pressure must thereby be chosen such that besides $Al_2O_3$ no further oxide is formed. Such conditions are met by "technical hydrogen". Same is as a rule contaminated with few ppm (parts per million) residual oxygen or residual moisture. At annealing temperature there is formed between the oxygen and the (residual) oxygen or the hydrogen and the residual moisture (water) a thermodynamic equilibrium which is characterized by an extremely low oxygen partial pressure. This oxygen partial pressure is sufficient to form pure aluminum oxide. The other alloy components are not oxidized. Spinells (composite oxides) are also under these conditions thermodynamically unstable.

By suitably choosing the reaction conditions (temperature T and time), aluminum oxide layers with layer thicknesses of few nanometers are formed. These cover layers behave pseudo-ductile and have a very high adhesive ability. The annealing under defined conditions leads to a uniform cover-layer structure, which can be well reproduced.

With this the purpose of the reproducible production of a wear-reducing layer on slide bearings is attained.

The formation of thin oxide layers in aluminum-containing copper alloys is already known from the DE-OS 4 417 455. In contrast to the there described method, a closed cover layer through adjustment of suitable reaction parameters is here described.

DETAILED DESCRIPTION

Figure 1:
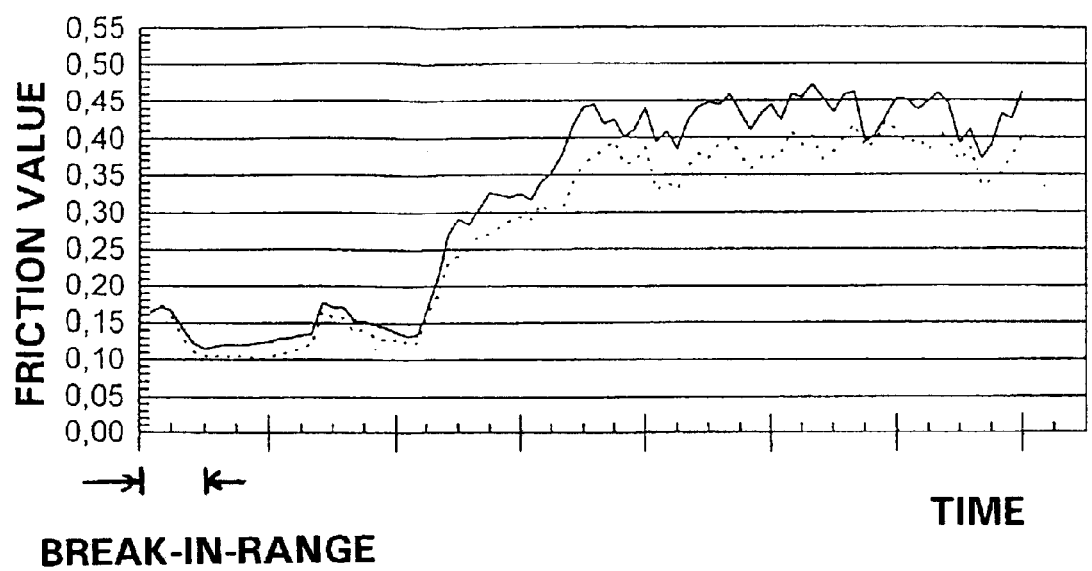
FIGS. 1 and 2 respectively illustrate the friction-values over time of a sleeve with a non-treated cover layer and a sleeve with a reaction or cover layer. The composition of the sleeve is in both cases: CuAl10.
Figure 2:
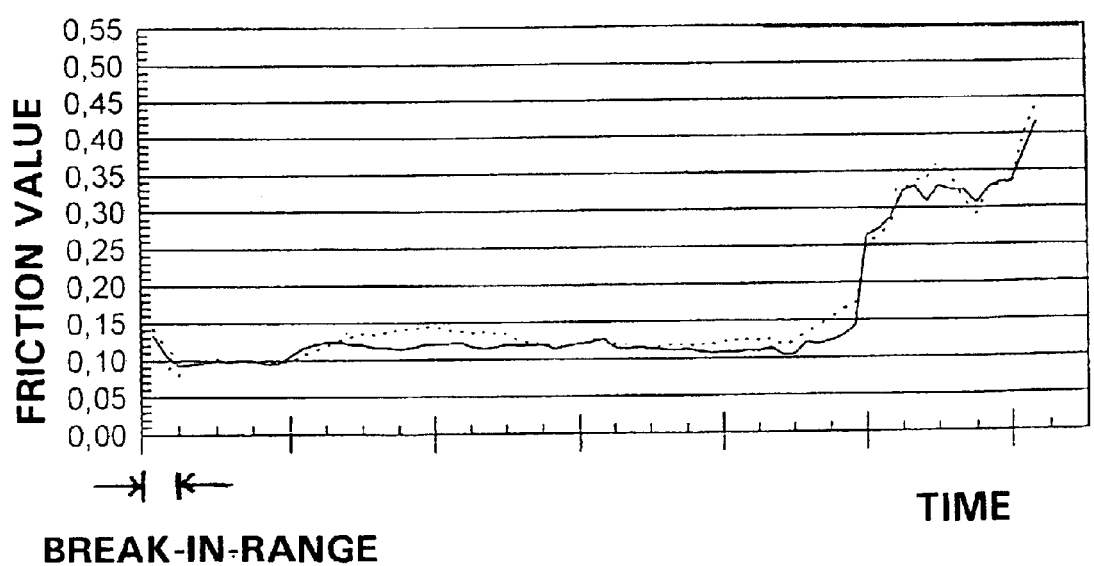

The invention will be discussed in greater detail in connection with the following exemplary embodiment:

The tests regarding the practical affects of the reaction layers were carried out on a slide-bearing test stand, where the slide bearing is oscillatingly moved relative to a stationary shaft. An adjustable load can be introduced into the slide bearing, which is to be tested, through this shaft through a lever mechanism (compare, for example, the WIELAND-Brochure: "Gleitelemente" {Slide Elements}, Edition 6/97, in particular Page 5).

The load was 17 N/mm$^2$ in the present case. 100 cycles/minute occurred at an angle of traverse of ±30° and initial lubrication with grease.

As a criteria for the effectiveness of the reaction layer, the break-in behavior of the bearing was utilized as it occurs, for example, as a friction-value over time (compare, for example, Dubbel: "Taschenbuch fuer den Maschinenbau" (Pocket Book for Mechanical Engineering 20$^{th}$ Edition/2001), in particular Page E86/E87).

Compared with non-treated bearings, the following improvements are found:

the friction value starts at a lower level, the break-in time is shorter, the usual increase of the friction value does not occur, but it drops immediately, stable friction-value course.

What is claimed is:

1. In a slide bearing having an outer surface comprising a wear-resistant layer which is brought into frictional engagement with a surface of another object, the improvement comprising said slide bearing outer surface being formed from a copper-aluminum alloy consisting of 0.01–20 wt. % aluminum, optionally at least one member selected from the group consisting of iron, cobalt, manganese, nickel, silicon and tin in a total amount up to 20 wt. %, optionally up to 45 wt. % zinc, with the remainder being copper and common impurities, and a uniform cover layer of a finite thickness and consisting of aluminum oxide.

2. A wear-resistant-copper-aluminum alloy slide bearing made of a copper-aluminum alloy with an outer, thin uniform cover layer, said copper-aluminum alloy consisting of 0.01–20 wt. % aluminum, optionally at least one member selected from the group consisting of iron, cobalt, manganese, nickel, silicon and tin in a total amount up to 20 wt. %, optionally up to 45 wt. % zinc, with the remainder being copper and common impurities, and said cover layer is of a finite thickness and consists of aluminum oxide.

3. The copper-aluminum alloy according to claim 2, wherein the content of aluminum is within the range of 5 to 16 wt. %.

4. The copper-aluminum alloy according to claim 2, wherein the content of aluminum is within the range of 9 to 11 wt. %.

5. The copper-aluminum alloy according to claim 2, wherein the content of aluminum is within the range of 14 to 16 wt. %.

6. The copper-aluminum alloy according to claim 2, wherein the thinness of the cover layer is in the range of D=10 nm to 10 $\mu$m.

7. The copper-aluminum alloy according to claim 6, wherein the thickness of the cover layer is in the range of D=10 to 100 nm.

8. The copper-aluminum-alloy according to claim 2, in which the cover layer is produced by annealing at annealing temperatures T=400 to 800° C. between 0.5 and 10 hours in a gas atmosphere with a low oxygen partial pressure.

9. The copper-aluminum-alloy according to claim 8, in which the cover layer is produced by annealing in an atmosphere having an oxygen partial pressure where only $Al_2O_3$ is formed.

10. The copper-aluminum alloy according to claim 2, wherein at least one member selected from the group consisting of iron, cobalt, manganese, nickel, silicon and tin is present in a total amount not exceeding 20 wt. %.

11. The copper-aluminum alloy according to claim 2, wherein zinc is present in an amount not exceeding 45 wt. %.

12. The copper-aluminum alloy according to claim 2, wherein at least one member selected from the group consisting of iron, cobalt, manganese, nickel, silicon and tin, in a total amount not exceeding 20 wt. %, and zinc, in an amount not exceeding 45 wt. %, is present.

* * * * *